United States Patent

Burton et al.

[11] 3,930,681
[45] Jan. 6, 1976

[54] AUTOMOTIVE VEHICLE TILT CAB LATCHING DEVICES

[75] Inventors: Arthur Malcolm Burton, Leighton Buzzard; Ronald Jost, Luton, both of England

[73] Assignee: General Motors Corporation, Detroit, Mich.

[22] Filed: Oct. 21, 1974

[21] Appl. No.: 516,266

[30] Foreign Application Priority Data
Nov. 8, 1973 United Kingdom............ 51835/73

[52] U.S. Cl.......... 296/35 R; 24/248 D; 105/366 C; 105/464; 292/97; 296/28 C; 298/38
[51] Int. Cl.²........................................ B62D 23/00
[58] Field of Search....... 296/35 R, 28 C; 180/89 A, 180/89 R; 292/DIG. 39, DIG. 40, DIG. 49, 97, 123, 196, 223; 24/248 R, 248 L, 248 BC, 248 D; 298/38; 105/464, 475, 366 R, 366 E, 366 C, 366 D

[56] References Cited
UNITED STATES PATENTS

| 2,427,603 | 9/1947 | Higgins............................ | 296/35 R |
| 2,995,794 | 8/1961 | Hacking........................... | 24/248 D |
| 3,825,295 | 7/1974 | Saunders et al.................. | 296/35 R |

*Primary Examiner*—Robert J. Spar
*Assistant Examiner*—Donald W. Underwood
*Attorney, Agent, or Firm*—Edward J. Biskup

[57] ABSTRACT

A tilt cab automotive vehicle has a latching device comprising a toggle clamp operable to clampingly engage a frame portion of the vehicle with a portion of the tilt cab to restrain the cab from inadvertent tilting during normal vehicle operation. Preferably an assembly utilizing two such devices interconnected by a linkage is provided, and is operable from one side of the vehicle.

5 Claims, 4 Drawing Figures

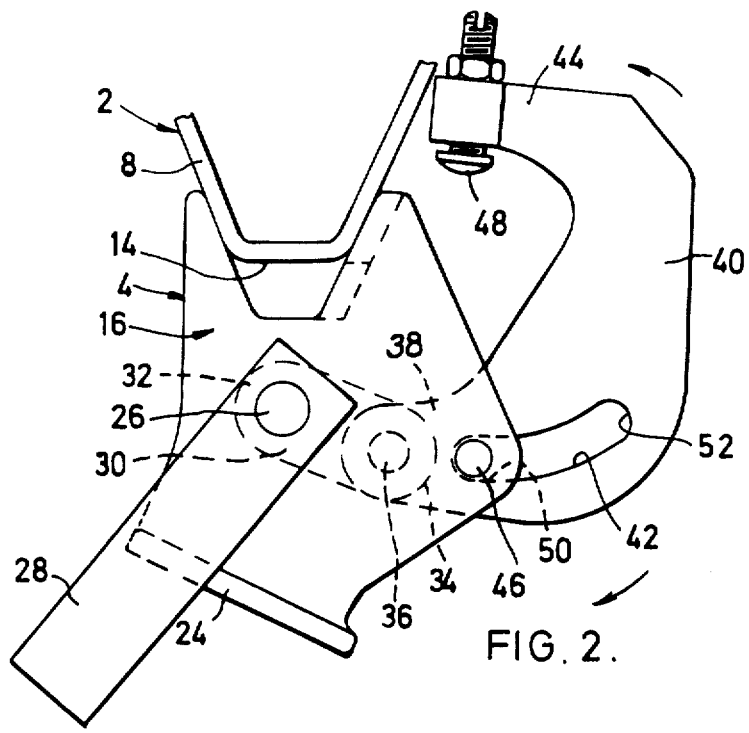
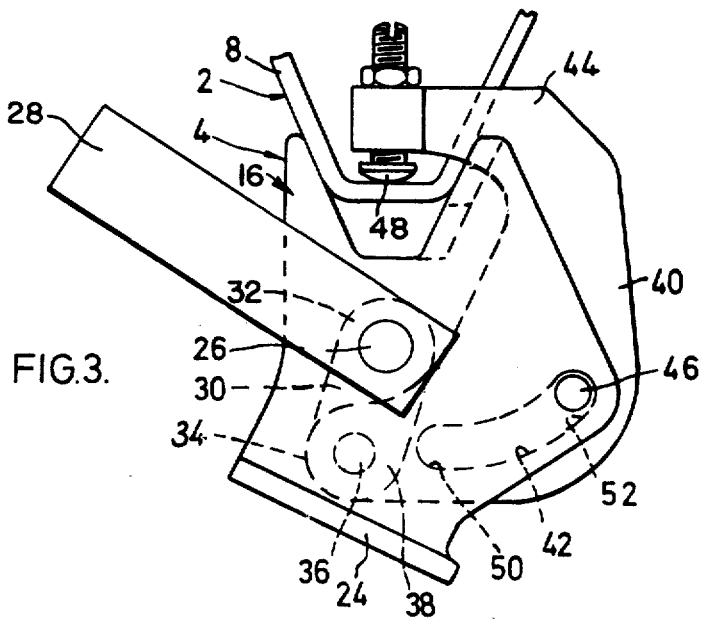

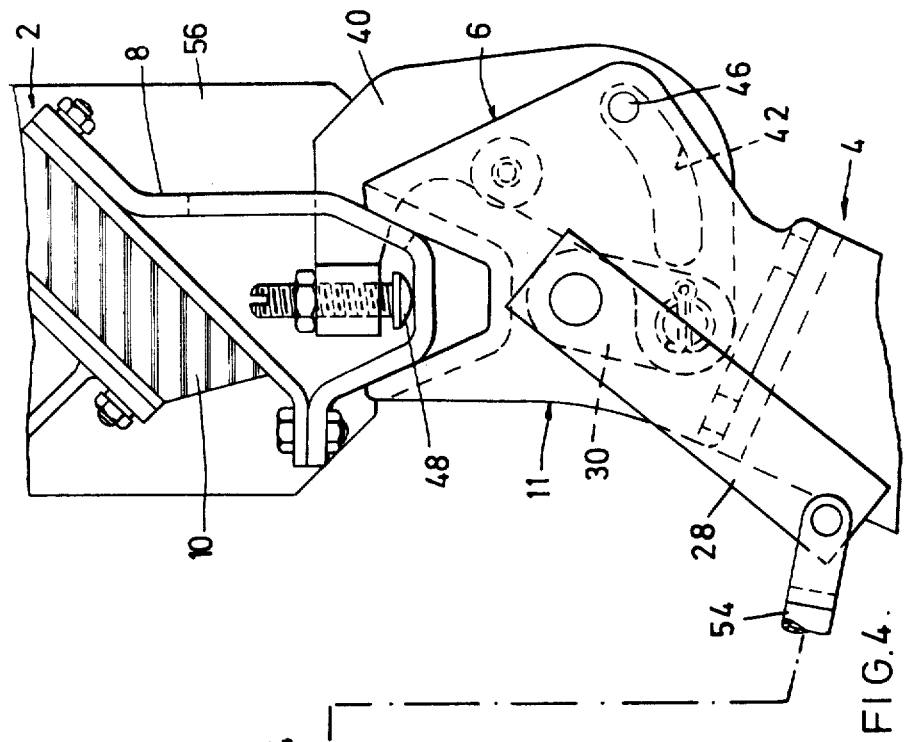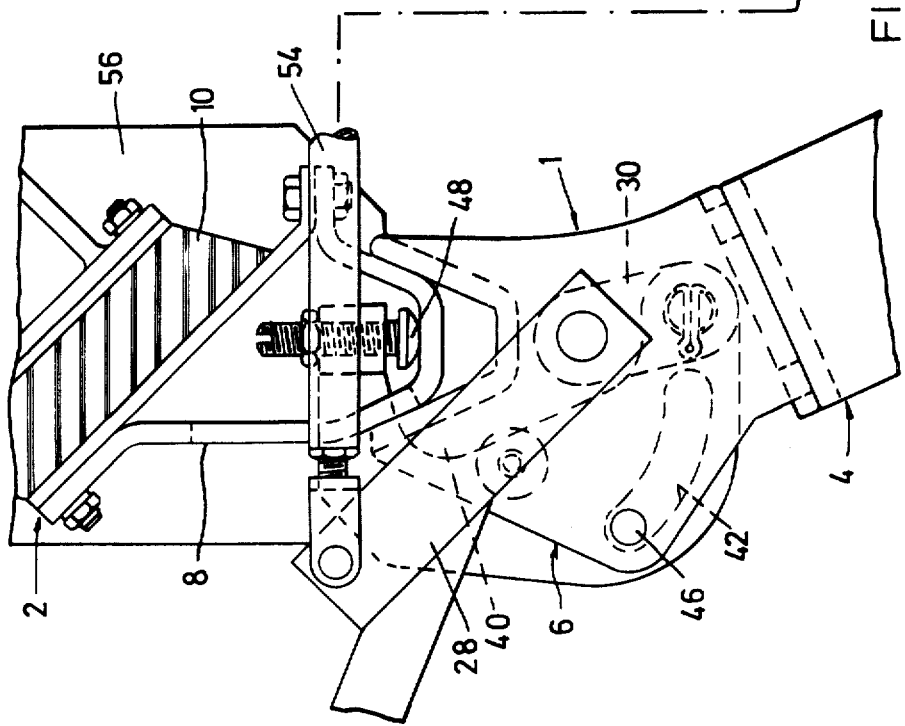
FIG.4.

AUTOMOTIVE VEHICLE TILT CAB LATCHING DEVICES

This invention relates to automotive vehicle tilt cab latching devices. It is desirable in automotive vehicles particularly commercial vehicles to provide as great a load carrying space on the vehicle as possible without rendering servicing of the vehicle unduly difficult or expensive in time or rendering difficult the access to parts such as the engine or steering gear. One way of achieving these ends is to provide the vehicle with a tilt cab, that is, one which can be raised about a hinge axis at the front of the vehicle to permit easy access to the engine and other mechanism normally shrouded by the cab when it is in the down position on the vehicle frame, as it would be for normal use. With such a tilt cab arrangement it is essential to provide a latching device to ensure that the cab will not unlatch and tilt forward.

In an automotive vehicle cab latching device according to the invention a portion of a member of the tilt cab is adapted to be engaged with a portion of a frame member of the vehicle and clamped thereto by means of an over-centre or toggle clamp comprising a pivot bar pivotally mounted in a latch housing secured on one of said members and pivotally movable therein by means of a lever fixed on one end of said bar, and an over-centre link fixed at one end on said bar and connected at its other end by a link pin to one end of a hook of greater length than said over-centre link, said housing and a portion of said hook intermediate the ends of the hook being interconnected by a guide-pin and slot connection arranged so that angular movement of said lever into a first predetermined position effects movement of the link and hook into a position in which the link is at an angle to a line joining said pivot bar and the point of engagement of said members, and a line joining the ends of the hook is at an angle to said link, and movement of said lever from said first position towards a second position pivots said over-centre link and link pin from their first said positions into a slightly over-centre position relative to a line joining said pivot bar axis and said point of engagement of said members and moves said hook angularly about said link pin relative to said over-centre link so that the free end of the hook is brought from a position disengaged from the other of said members into a position in which it engages said other member and clamps it against the first member.

Preferably two such devices are provided, one on each side of the vehicle and a linkage interconnects the two devices so that operation of one device also operates the other.

The slot of the pin and slot connection may be curved along its length and the curvature at one end portion of the slot may be such that relative movement between said one end portion and said guide-pin results in a greater angular movement of the hook than results from the relative movement of the remainder of the slot and the guide-pin.

The length of the guide-pin may be such as to permit of its flexing as the hook is moved to and from its first and second positions and by such flexing the guide-pin can accommodate the lengthwise displacement of the hook as it pivots about the link pin and said other member.

The appended claims define the scope of the monopoly claimed. How the invention can be performed is hereinafter particularly described with reference to the accompanying drawings, in which:

FIG. 2 is a side view, to a smaller scale, showing the device of FIG. 1 assembled and indicating the disengaged position of its hook;

FIG. 3 is a view, similar to FIG. 2, with the hook in its engaged position; and

FIG. 4 is a view from the rear of the vehicle and looking forward to the front of the vehicle and showing two devices according to the invention located at the rear of the cab and connected to one another by a linkage.

Figure 1:
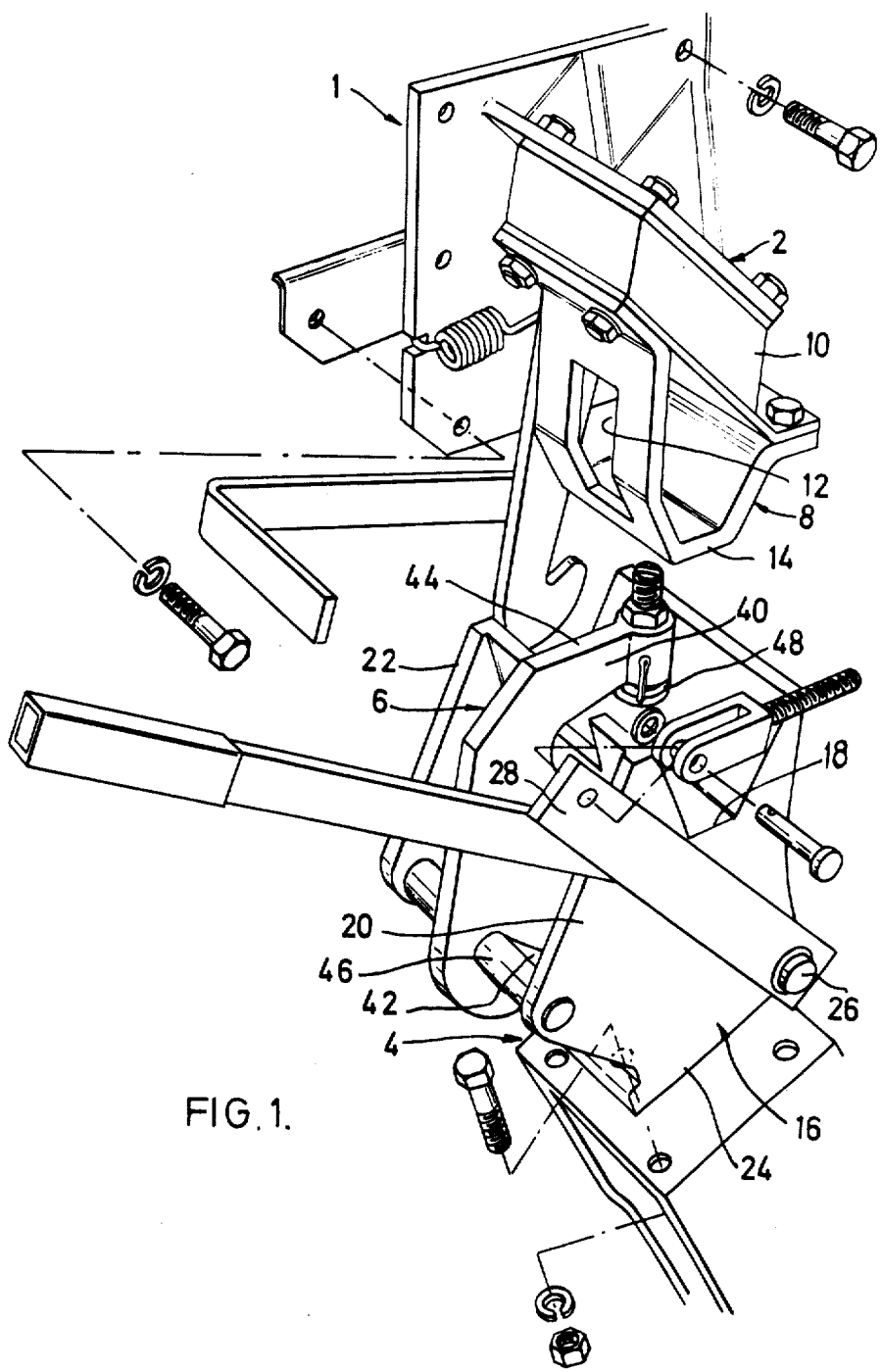
FIG. 1 is an exploded perspective view of a device according to the invention.

FIGS. 1 to 3 show an automotive tilt cab latching device 1 according to the invention; the vehicle however is not shown in these Figures. The device shown in these Figures has a cab member 2 adapted to be engaged with a frame member 4 of the vehicle and clamped thereto by a toggle clamp 6. The cab member comprises a channel-shaped plate 8 securable at its open edges to a resilient mounting 10 on the vehicle cab (not shown). The channel plate 8 has an aperture 12 in one side through which can pass a hook 40 of the device, as will be later described, and the closed base portion 14 of the channel plate is engageable in a complementary trough shaped portion 18 of a latch housing 16 fixed on, and constituting a portion of, the frame member 4 of the vehicle. The latch housing 16 conveniently is formed as a casting the general shape of which is that of a box in which said trough shaped portion is the upper wall, and in which one side wall adjacent the two end walls 20, 22 connected to said trough shaped portion is omitted. The base 24 of the housing is adapted to be secured on the frame member 4 of the vehicle in a position such that when the vehicle cab is in the down position bearing on the frame member, the closed base portion 14 of the cab member is received in the trough portion 18 of the latch housing 16. The cab member 2 is clamped to the frame member 4 by means of a toggle clamp 6 comprising a pivot bar 26 pivotally mounted in the side walls 20, 22 of the latch housing and pivotable by means of a lever 28 fixed on one end of the bar, and an over-centre link 30 fixed at one end 32 on said bar and connected at its other end 34 by a link pin 36 to one end 38 of a hook 40 of greater length than said over-centre link 30. The hook 40 has a curved slot 42 intermediate its ends 38, 44 and a guide-pin 46 journalled in the side walls 20, 22 of the housing outboard of the pivot bar 26 extends through the slot 42 in the hook 40. A domed adjuster bolt 48 is located in the other or free end 44 of the hook 40 and forms a curved end portion or the head of the hook.

The operation of the device 1 is as follows, it being assumed that the cab is in the down position resting on the vehicle frame 4 and the cab member 2 is engaged in the trough-like wall portion 18 of the latch housing 16. The hook 40 at this point is seen to be swung away from the cab member 2 (as shown in FIG. 2). In this first predetermined position the link 30 and the hook 40 are in a position in which the link is at an angle to a line joining the pivot bar 26 and the point of engagement of the members 2, 4 (for convenience this may be considered to be on the centre line of the base of the trough-like wall of the latch housing) and a line joining the ends 38, 44 of the hook 40 is at an angle to said link 30. Movement of the lever 28 (clockwise as viewed in the drawing) from the first position towards a second position (shown in FIG. 3) pivots the over-centre link 30 and link pin 36 clockwise from their first said positions into a slightly over-centre position relative to a line joining said pivot bar axis and said point of engagement of said members 2, 4 and the engagement of the slot 42 in the hook 40 with the guide-pin 46 moves said hook 40 anti-clockwise about said link pin 36 relative to said over-centre link 30 so that the free end 44 of the hook is brought from its first position, disengaged from the cab member 2, into a second position in which it is engaged with the cab member 2 and clamps it against the latch housing 4, thereby securing the cab to the vehicle frame.

The slot 42 has a sharper curvature at its end portion 50 adjacent the link pin 36 than over the rest of its length so that movement of that end portion 50 about the guide-pin 46 results in a greater angular movement of the hook 40 for movement of that length of the slot relative to the guide-pin than results from movement of the remainder of the slot relative to the pin. The effect of this is to move the hook 40 rapidly into or out of engagement with the cab member 2 depending upon whether the hook is being engaged or disengaged from the cab member.

The length of the guide-pin 46 (FIG. 1) is such that the pin can flex to accommodate the slight lengthwise movement of the hook 40 as it pivots about its over-centre position when being engaged or disengaged from the cab member 2. In the slightly over-centre position, the hook 40 is in tension between the point of engagement of its curved head 48 with the cab member 2 and the link pin 36, and the over-centre link 30 is in compression between the link pin 36 and the pivot bar 26. Further movement of the toggle clamp 6 is prevented by the guide-pin 46 abutting the end 52 of the slot 42. Because of this over-centre position of the toggle clamp 6 any attempt to move the cab member 2 away from the frame member 4 without moving the toggle clamp 6 out of its slightly over-centre position serves only to latch the two members 2, 4 more securely together.

The domed head bolt 48 at the contoured free end 44 of the hook can be adjusted to take up manufacturing tolerances and wear to ensure that there is no play between the hook and the cab member when the hook is in the engaged position. Additionally, as the hook is moved into or out of engagement with the cab member the domed head bolt rolls into or out of engagement with the cab member, thus minimizing wear of the contacting parts. The guide slot 42 may be widened at its other end 52 remote from the over-centre link 30, to permit a slight change in the angular movement of the hook 40 so that the bolt 48 can pivot and ensure that its domed head rolls over the cab member 2 without straining the slot 42 against the pivot bar 26.

As shown in FIG. 4, two devices 1, 11 according to the invention are mounted on the vehicle, and in the Figure, a portion of the cab 56 is shown latched to the frame members 4. These two devices are interconnected by a rigid link 54 so that operation of one device also operates the other. The guide-pin 46 and slot 42 connection ensures that in each device 1, 11 the hook 40 moves in a predetermined path thus ensuring that the two devices can be operated in unison.

The positions of the first or cab member 2 and the latch housing 16 could be reversed so that the first member 2 was secured to the frame 4 and the latch housing to the cab 56.

If desired, a stop member could be provided on the pivot bar 26 for movement into or out of engagement with a stop surface on the device 6 to ensure that with the pin slot connection only the design angular movement of the hook 40 will occur.

An automotive vehicle tilt cab latching device as described above provides a convenient and effective way of securing a vehicle tilt cab to the vehicle frame when the cab is in the down position and which restrains the cab from tilting during normal use of the vehicle.

Additionally, when two devices are used they can be interconnected for operation from one side of the vehicle, which is a great convenience to the operator.

We claim:

1. In an automotive vehicle having a frame and a tilt cab adapted to be tilted about a hinge axis at the front of the vehicle frame from a down position to a raised position thereon, a tilt cab latching device comprising:
   a tilt cab member movable, upon tilting of the cab, into and out of abutment with a member of said vehicle frame,
   and a toggle clamp operable to clamp said tilt cab member and said frame member together when said tilt cab is in the down position, said toggle clamp comprising:
   a latch housing secured on one of said tilt cab and frame members;
   a pivot bar pivotally mounted on said housing and pivotable about the longitudinal axis of said pivot bar;
   a lever fixed at one end thereof on said pivot bar and operable to pivot said pivot bar about said axis;
   an over-centre link fixed at one end thereof on said pivot bar, and having at its other end a link pin;
   a hook member of greater length than said over-centre link, and having two opposed ends, one of which is pivotally mounted on said link pin;
   means connecting said hook member and said latch housing, said means comprising a slot formed in said hook member adjacent said one end thereof, and a guide-pin secured in said housing and extending through said slot, the means constraining said hook member so that angular movement of said lever into a first predetermined position effects movement of the hook member and the over-centre link into a position in which the over-centre link is at an angle to a line joining said pivot bar and the position of abutment of said tilt cab and frame members, a line joining the ends of the hook member is at an angle to said over-centre link and the other end of said hook member is disengaged from the other of said tilt cab and frame members;
   and movement of the lever towards a second predetermined position pivots said over-centre link and link pin into a position over-centre relative to a line joining said pivot bar axis and said abutment position of said tilt cab and frame members, and the means constrains the hook member to move angularly about said link pin relative to said over-centre link whereby the other end of the hook member is brought into engagement with said other member to clamp together said tilt cab and frame members and latch said tilt cab to said frame.

2. In an automotive vehicle having a frame and a tilt cab adapted to be tilted about a hinge axis at the front of the vehicle frame from a down position to a raised position thereon, a tilt cab latching device comprising:

a tilt cab member movable, upon tilting of the cab, into and out of abutment with a member of said vehicle frame;

and a toggle clamp operable to clamp said tilt cab member and said frame member together when said tilt cab is in the down position, said toggle clamp comprising;

a box-like structure having a base secured on said frame member, and a facing top side spaced from said base by two facing walls connected by a third wall and defining three sides of the box-like structure, said box-like structure having an open fourth side, said box-like structure forming a latch housing of said device;

a pivot bar pivotally mounted in the two facing walls of said latch housing for pivotal movement about the longitudinal axis of said pivot bar, said pivot bar having one end thereof extending outwardly of one wall of said housing;

a lever fixed at one end thereof on said pivot bar end, and having at its other end a pivot pin;

an over-centre link fixed at one end thereof on said pivot bar, and having at its other end a link pin;

a hook member of greater length than said over-centre link, and having two opposed ends, one of which is pivotally mounted on said link pin within said latch housing, the other end at least of said hook member extending outwardly of said latch housing through said open side thereof;

means connecting said hook member and said latch housing, said means comprising an arcuate slot formed in said hook member adjacent said one end thereof, and a guide pin extending through said arcuate slot and mounted at its ends in said two facing walls of said latch housing, the means constraining said hook member so that angular movement of said lever into a first predetermined position effects movement of the hook member and the over-centre link into a position in which the over-centre link is at an angle to a line joining said pivot bar and the position of abutment of said tilt cab and frame members, a line joining the ends of the hook member is at an angle to said over-centre link and the other end of said hook member is disengaged from the tilt cab member;

and movement of the lever towards a second predetermined position pivots said over-centre link and said link pin into a position over-centre relative to a line joining said pivot bar axis and said abutment position of said tilt cab and frame members, and the means constrains the hook member to move angularly about said link pin relative to said over-centre link whereby the other end of the hook member is brought into engagement with the tilt cab member to clamp together said tilt cab and frame members and latch said tilt cab to said frame;

and the curvature of said arcuate slot at one end portion thereof differs from the curvature of the remainder of said arcuate slot such that relative movement between said one end portion and the guide pin results in a greater angular movement of the hook member than results from movement of the remainder of the slot about the guide pin, for quick initial movement of said hook member into and out of engagement with said tilt cab member.

3. An automotive vehicle tilt cab latching device as defined in claim 2, in which the length of the guide pin is such as to permit flexing of the guide pin as the hook member is moved to and from its over-centre position.

4. An automotive vehicle tilt cab latching device as defined in claim 2, in which the other end of the hook member has a contoured portion which effects rolling contact with said tilt cab member as the hook member is brought into engagement therewith.

5. In an automotive vehicle having a frame and a tilt cab adapted to be tilted about a hinge axis at the front of the vehicle from a down position to a raised position thereon, the tilt cab having at least a back wall and two opposed side walls, a latching assembly comprising:

two tilt cab member portions extending from said back wall and each adjacent a respective one of said side walls, each tilt cab member portion being movable, upon tilting of the cab, into and out of abutment with a surface on a respective one of a pair of latch housings secured on the frame of the vehicle;

and a pair of toggle clamps operable to clamp said tilt cab member portions against said surfaces when said tilt cab is in the down position, each toggle clamp comprising:

a box-like structure having a base secured on the frame of the vehicle, a facing top side spaced from said base by two facing wall portions connected by a third wall and defining three sides of the box-like structure, said box-like structure having an open fourth side, said box-like structure forming a latch housing of said device, each facing top side defining the respective surface of the latch housing for abutment by the respective tilt cab member portion;

a pivot bar pivotally mounted in the two facing walls of said latch housing for pivotal movement about the longitudinal axis of said pivot bar, said pivot bar having one end extending outside one of said two facing walls;

a lever fixed at one end thereof on said one end of the pivot bar, and having at its other end a pivot pin;

an over-centre link fixed at one end thereof on said pivot bar, and having at its other end a link pin;

a hook member of greater length than said over-centre link having two opposed ends, one of which is pivotally mounted on said link pin within said latch housing, the other end at least of said hook member extending outwardly of said latch housing through said open side thereof, said other end of said hook member having a contoured portion thereon which effects rolling contact with said tilt cab member portion when said hook member is brought into contact with said tilt cab member portion;

means connecting said hook member and said latch housing, said means comprising an arcuate slot formed in said hook member adjacent said one end thereof, and a guide pin extending through said arcuate slot and mounted at its ends in said two facing walls of the latch housing, the means constraining the hook member so that angular movement of said lever into a first predetermined position effects movement of the hook member and the over-centre link into a position in which the over-centre link is at an angle to a line joining said pivot bar and the position of abutment of said tilt cab member portion with said surface of said latch housing, a line joining the ends of the hook member is at an angle to said over-centre link, and the other end of said hook member is disengaged from said tilt cab member portion;

and movement of said lever to a second predetermined position pivots said over-centre link and said link pin to a position over-centre relative to a line joining said pivot bar axis and said abutment position of said tilt cab member portion with said surface of said latch housing, and the means constrains the hook member to move angularly about said link pin relative to said over-centre link whereby the other end of said hook member is brought into engagement with said tilt cab member portion, said contoured end portion of said hook member other end rolling over said tilt cab member portion to clampingly abut said tilt cab member portion against said latch housing surface and latch said tilt cab to said frame;

said arcuate slot having one end portion thereof with a different curvature from the remainder of said slot length such that relative movement between said one end portion of said arcuate slot and the guide pin results in a greater angular movement of the hook member than results from movement of the remainder of the slot length about said guide pin to thereby effect quick initial movement of said hook member into and out of engagement with said tilt cab member portion.

* * * * *